(12) United States Patent
Tatsumi et al.

(10) Patent No.: US 12,320,539 B2
(45) Date of Patent: Jun. 3, 2025

(54) AIR SUPPLY SYSTEM

(71) Applicant: DAIKIN INDUSTRIES, LTD., Osaka (JP)

(72) Inventors: Kouji Tatsumi, Osaka (JP); Ryouta Suzuki, Osaka (JP); Taishi Nakashima, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 581 days.

(21) Appl. No.: 17/603,785

(22) PCT Filed: Apr. 15, 2020

(86) PCT No.: PCT/JP2020/016620
§ 371 (c)(1),
(2) Date: Oct. 14, 2021

(87) PCT Pub. No.: WO2020/218127
PCT Pub. Date: Oct. 29, 2020

(65) Prior Publication Data
US 2022/0214071 A1 Jul. 7, 2022

(30) Foreign Application Priority Data

Apr. 15, 2019 (JP) .................................. 2019-077305
Apr. 15, 2019 (JP) .................................. 2019-077306
(Continued)

(51) Int. Cl.
*F24F 11/77* (2018.01)
*F24F 3/044* (2006.01)
(Continued)

(52) U.S. Cl.
CPC .............. *F24F 11/77* (2018.01); *F24F 3/044* (2013.01); *F24F 2110/10* (2018.01);
(Continued)

(58) Field of Classification Search
CPC .. F24F 11/77; F24F 11/74; F24F 3/044; F24F 3/001; F24F 2110/10; F24F 2110/20; F24F 2110/40; F24F 2110/70; F24F 2003/003
(Continued)

(56) References Cited

U.S. PATENT DOCUMENTS 4,513,574 A 4/1985 Humphreys et al.
4,635,445 A 1/1987 Otsuka et al.
(Continued)

FOREIGN PATENT DOCUMENTS

CN 101769574 A 7/2010
CN 109163386 A 1/2019
(Continued)

OTHER PUBLICATIONS

Extended European Search Report for European Application No. 19925110.9, dated May 9, 2022.
(Continued)

*Primary Examiner* — Steven B McAllister
*Assistant Examiner* — Charles R Brawner
(74) *Attorney, Agent, or Firm* — Birch, Stewart, Kolasch & Birch, LLP (57) ABSTRACT

An air supply system moderates excess energy consumption occurring in fans. A second unit includes a second fan that supplies first air to a target space. A duct sends the first air sent from a first unit by a first fan to the second unit. A remote sensor acting as a first detector detects information about second air in the target space. A main controller acting as a first controller communicates with the second unit and the remote sensor. The second unit includes a second detector that detects the air flow volume sent by the second fan, and a sub-controller acting as a second controller that controls the rotation speed of the second fan. The main
(Continued)

controller determines a target air flow volume of the second unit on the basis of the information about the second air acquired from the remote sensor, and transmits an instruction indicating the target air flow volume to the sub-controller. The sub-controller controls the rotation speed of the second fan such that the air flow volume detected by the second detector approaches the target air flow volume.

21 Claims, 7 Drawing Sheets

(30)  Foreign Application Priority Data

Apr. 15, 2019 (JP) ................................ 2019-077307
Jun. 24, 2019 (JP) ................................ 2019-116144

(51) Int. Cl.
  *F24F 110/10* (2018.01)
  *F24F 110/20* (2018.01)
  *F24F 110/40* (2018.01)
  *F24F 110/70* (2018.01)
(52) U.S. Cl.
  CPC ....... *F24F 2110/20* (2018.01); *F24F 2110/40* (2018.01); *F24F 2110/70* (2018.01)
(58) Field of Classification Search
  USPC ...................................................... 454/255
  See application file for complete search history.

(56)  References Cited

U.S. PATENT DOCUMENTS

| | | | |
|---|---|---|---|
| 4,693,175 A | 9/1987 | Hashimoto | |
| 4,921,164 A | 5/1990 | Gotou et al. | |
| 4,997,030 A | 3/1991 | Goto et al. | |
| 5,004,149 A | 4/1991 | Narikiyo et al. | |
| 5,025,638 A | 6/1991 | Yamagishi et al. | |
| 5,179,524 A | 1/1993 | Parker et al. | |
| 5,230,719 A | 7/1993 | Berner et al. | |
| 5,344,069 A | 9/1994 | Narikiyo | |
| 5,417,077 A | 5/1995 | Jeffery et al. | |
| 5,417,368 A | 5/1995 | Jeffery et al. | |
| 5,772,501 A | 6/1998 | Merry et al. | |
| 5,863,246 A | 1/1999 | Bujak, Jr. | |
| 5,979,167 A | 11/1999 | Kochavi et al. | |
| 6,076,346 A | 6/2000 | Nakayama | |
| 6,305,953 B1 | 10/2001 | Shi et al. | |
| 6,601,168 B1 | 7/2003 | Stancil et al. | |
| 6,701,750 B2 | 3/2004 | Maeda | |
| 8,483,883 B1 | 7/2013 | Watson | |
| 8,814,639 B1 | 8/2014 | Mecozzi | |
| 9,188,355 B1* | 11/2015 | Allen ...................... F24F 11/77 | |
| 9,534,797 B2 | 1/2017 | Tsutsumi | |
| 11,614,244 B2 | 3/2023 | Tanaka et al. | |
| 2005/0087614 A1* | 4/2005 | Ruise ...................... F24F 7/06 62/186 | |
| 2005/0155367 A1 | 7/2005 | Shah | |
| 2006/0105697 A1* | 5/2006 | Aronstam ................ F24F 11/74 454/256 | |
| 2006/0116067 A1 | 6/2006 | Federspiel | |
| 2006/0234621 A1 | 10/2006 | Desrochers et al. | |
| 2007/0178823 A1* | 8/2007 | Aronstam ................ F24F 3/00 165/205 | |
| 2008/0242218 A1 | 10/2008 | Asano et al. | |
| 2010/0174414 A1 | 7/2010 | Takagi et al. | |
| 2010/0323604 A1 | 12/2010 | Duffe | |
| 2012/0192955 A1 | 8/2012 | Dazai | |
| 2012/0295530 A1 | 11/2012 | Ikeno et al. | |
| 2013/0265064 A1 | 10/2013 | Hamann et al. | |
| 2013/0281000 A1 | 10/2013 | Newcomer | |
| 2014/0273797 A1 | 9/2014 | Jensen | |
| 2015/0050876 A1 | 2/2015 | Sakai et al. | |
| 2015/0241076 A1 | 8/2015 | Eguchi et al. | |
| 2017/0023269 A1* | 1/2017 | Gevelber ................ F24F 11/46 |
| 2017/0219231 A1* | 8/2017 | Hui .......................... F24F 11/76 |
| 2017/0299211 A1 | 10/2017 | Kobayashi | |
| 2017/0341094 A1 | 11/2017 | Khalitov et al. | |
| 2018/0045424 A1 | 2/2018 | Yajima et al. | |
| 2018/0100087 A1 | 4/2018 | Komae et al. | |
| 2018/0145642 A1 | 5/2018 | Kita | |
| 2018/0363933 A1* | 12/2018 | Ross ........................ F24F 11/77 |
| 2019/0024929 A1 | 1/2019 | Funada et al. | |
| 2019/0331358 A1 | 10/2019 | Ritmanich et al. | |
| 2020/0011562 A1 | 1/2020 | Turney et al. | |
| 2020/0340485 A1 | 10/2020 | Fessel et al. | |
| 2020/0340704 A1* | 10/2020 | Ross ........................ F24F 11/30 |
| 2021/0404695 A1 | 12/2021 | Saito et al. | |
| 2022/0412596 A1 | 12/2022 | Ross | |

FOREIGN PATENT DOCUMENTS

| | | |
|---|---|---|
| DE | 20 2018 000 922 U1 | 5/2018 |
| EP | 2 781 846 A1 | 9/2014 |
| GB | 2528842 A | 2/2016 |
| JP | 59-184033-0 | 12/1984 |
| JP | 59-184033 U | 12/1984 |
| JP | 60-21653 U | 2/1985 |
| JP | 61-71840 U | 5/1986 |
| JP | 81-73840 U | 5/1988 |
| JP | 1-300135 A | 12/1989 |
| JP | 4-32634 A | 2/1992 |
| JP | 4-116329 A | 4/1992 |
| JP | 5-157278 A | 6/1993 |
| JP | 5-180501 A | 7/1993 |
| JP | 5-223328 A | 8/1993 |
| JP | 6-50597 A | 2/1994 |
| JP | 6-159770 A | 6/1994 |
| JP | 7-28033 A | 10/1995 |
| JP | 8-42909 A | 2/1996 |
| JP | 8-261545 A | 10/1996 |
| JP | 10-220853 A | 8/1998 |
| JP | 10-253132 A | 9/1998 |
| JP | 11-132489 A | 5/1999 |
| JP | 2001-304614 A | 10/2001 |
| JP | 2002-162067 A | 6/2002 |
| JP | 2002-372277 A | 12/2002 |
| JP | 2005-326106 A | 11/2005 |
| JP | 2008-51466 A | 3/2008 |
| JP | 2009-145004 A | 7/2009 |
| JP | 2009-186062 A | 8/2009 |
| JP | 2010-108359 A | 5/2010 |
| JP | 2010-181046 A | 8/2010 |
| JP | 2010-210216 A | 9/2010 |
| JP | 2011-52905 A | 3/2011 |
| JP | 2012-77968 A | 4/2012 |
| JP | 2012-141088 A | 7/2012 |
| JP | 2012-154596 A | 8/2012 |
| JP | 2012-225640 A | 11/2012 |
| JP | 5426322 B2 | 2/2014 |
| JP | 2014-92293 A | 5/2014 |
| JP | 2014-95541 A | 5/2014 |
| JP | 2015-206519 A | 11/2015 |
| JP | 2018-100791 A | 6/2018 |
| JP | 2018-155444 A | 10/2018 |
| JP | 2019-11884 A | 1/2019 |
| JP | 2019-49387 A | 3/2019 |
| KR | 10-1128574 B1 | 3/2012 |
| TW | M566801 U | 9/2018 |
| TW | 1851493 B | 2/2019 |
| WO | WO 2011/077007 A1 | 6/2011 |
| WO | WO2017/159208 A1 | 9/2017 |
| WO | WO2018/100657 A1 | 6/2018 |

OTHER PUBLICATIONS

Extended European Search Report for European Application No. 20790587.8, dated Apr. 25, 2022.
Extended European Search Report for European Application No. 20790812.0, dated May 9, 2022.

(56) References Cited

OTHER PUBLICATIONS

Extended European Search Report for European Application No. 20791231.2, dated May 13, 2022.
Extended European Search Report for European Application No. 20791360.9, dated May 9, 2022.
Extended European Search Report for European Application No. 20794326.7, dated May 19, 2022.
Chinese Office Action and Search Report for Chinese Application No. 202080029089.8, dated Jun. 29, 2022, with an English translation.
Tragon, "Mine Ventilation Technology and Air Conditioning" Coal Industry Press, 1st Edition, May 2014, pp. 93-95 (6 pages total).
International Search Report for PCT/JP2020/016620 mailed on Jul. 7, 2020.
International Preliminary Report on Patentability and English translation of the Written Opinion of the International Searching Authority for International Application No. PCT/JP2020/016620, dated Oct. 28, 2021.
Extended European Search Report for European Application No. 24159348.2, dated May 10, 2024.

* cited by examiner

AIR SUPPLY SYSTEM

TECHNICAL FIELD

The present disclosure relates to an air supply system that uses a duct to distribute air supplied to a target space such as a room inside a building.

BACKGROUND ART

Patent Literature 1 (JP 2001-304614 A) discloses an air conditioning system provided with a main air conditioner unit including a heat exchange coil, and a fan unit including a fan that sends heat-exchanged air. Each fan unit in Patent Literature 1 is connected to a plurality of outlets through ducts, such that the heat-exchanged air is distributed to a plurality of outlets and ventilated to air conditioning zones by the single main air conditioner unit.

A controller in Patent Literature 1 controls a pump motor of a pump unit with an adjustable flow rate that sends a heat medium from a heat source to the heat exchange coil, and the rotational speed of a fan motor in the plurality of fan units. A sensor is provided in the plurality of outlets, and the controller controls the air flow volume of each fan and the heat medium flow rate of the heat exchange coil according to variations in the total numerical value of blow-out air flow volume signals from the sensors.

SUMMARY OF THE INVENTION

Technical Problem

The rotational speed of each fan motor in the plurality of fan units described in Patent Literature 1 is controlled by a single controller provided externally to the plurality of fan units. The controller in Patent Literature 1 controls the rotational speed of the fan motor of each fan unit while checking the blow-out air flow volume signals from the plurality of sensors provided in the plurality of outlets in each fan unit. Consequently, the control load on the controller according to Patent Literature 1 is increased.

Reducing the control load is an issue to be addressed in an air supply system provided with a fan unit having a controllable air flow volume.

Solution to Problem

An air supply system according to a first aspect is provided with a first unit, a second unit, a duct, a first detector, and a first controller. The first unit includes a first fan. The second unit includes a second fan that supplies first air to a target space. The duct sends the first air delivered from the first unit by the first fan to the second unit. The first detector detects information about second air in the target space. The first controller communicates with the second unit and the first detector. The second unit includes a second detector that detects the air flow volume sent by the second fan, and a second controller that controls the rotation speed of the second fan. The first controller determines a target air flow volume of the second unit on the basis of the information about the second air acquired from the first detector, and transmits an instruction indicating the target air flow volume to the second controller. The second controller controls the rotation speed of the second fan such that the air flow volume detected by the second detector approaches the target air flow volume.

In the air supply system according to the first aspect, the second unit receives the indicated value of the air flow volume from the first controller, and the second controller can automatically control the air flow volume in the second unit itself without depending on the first controller. It is sufficient to supply the indicated value of an appropriate air flow volume from the first controller to the second unit, and the control load on the first controller can be reduced.

The air supply system according to the second aspect is the system according to the first aspect, in which the first unit includes a heat exchanger through which a heat medium flows. The heat exchanger causes heat to be exchanged between the first air sent by the first fan and the heat medium.

In the air supply system according to the second aspect, the first unit can exchange heat with the heat medium in the heat exchanger and send the air-conditioned first air to the second unit. The second unit can use the air-conditioned first air to air-condition the target space.

The air supply system according to the third aspect is the system according to the second aspect, in which the first detector is a temperature sensor, a $CO_2$ concentration sensor, or a humidity sensor, and the first controller determines the target air flow volume of the second unit on a basis of a set temperature, a set $CO_2$ concentration, or a set humidity of the target space set in advance and a value detected by the first detector.

In the air supply system according to the third aspect, the first controller can control the air flow volume of the second unit according to the target air flow volume to keep at least one of the temperature, the humidity, and the $CO_2$ concentration of the target space in a suitable range.

The air supply system according to the fourth aspect is the system according to any of the first aspect to the third aspect further including a third detector, disposed on a downstream side of the first unit, that detects a pressure of the first air sent by the first fan. The first controller controls a rotation speed of the first fan to keep a value of the pressure acquired from the third detector in a predetermined range.

By keeping the value of the pressure on the downstream side of the first unit in a predetermined range, the air supply system according to the fourth aspect can eliminate excess power consumption occurring in the first fan and the second fan compared to the case where the value of the pressure on the downstream side of the first unit is outside the predetermined range.

The air supply system according to the fifth aspect is the system according to any of the first aspect to the fourth aspect, including a plurality of second units. The duct sends the first air sent from the first unit by the first fan to the plurality of second units. A plurality of first detectors are respectively provided in correspondence with the plurality of second units. The first controller determines a plurality of target air flow volumes of the plurality of second units on a basis of the information about the second air in the target space acquired from the plurality of first detectors, and transmits instructions indicating each target air flow volume to each second controller.

In the air supply system according to the fifth aspect, the first controller can control the output of the first fan to match the air quantity of the first air supplied by the plurality of second fans. With this arrangement, the air supply system can lower power consumption.

The air supply system according to the sixth aspect is the system according to the fifth aspect, in which in a case of changing an operating state of at least one of the plurality of second fans or changing the air flow volume of at least one of the plurality of second fans, the first controller prioritizes increasing an output of a fan with high fan efficiency or decreasing the output of a fan with low fan efficiency from among the first fan and the plurality of second fans.

In the air supply system according to the sixth aspect, the first controller controls to prioritize increasing the output of a fan with high fan efficiency, or decreasing the output of a fan with low fan efficiency, from among the first fan and the plurality of second fans. This configuration reduces the energy consumption of the air supply system.

The air supply system according to the seventh aspect is the system according to the sixth aspect, in which the first controller determines the output of the first fan to maintain a constant processing static pressure in the second fan with the highest fan efficiency from among the plurality of second fans or to maximize the rotation speed of the second fan with the highest fan efficiency from among the plurality of second fans.

In the air supply system according to the seventh aspect, the first controller determines the output of the first fan to maintain a constant processing static pressure in the second fan with the highest fan efficiency from among the plurality of second fans or to maximize the rotation speed of the second fan with the highest fan efficiency from among the plurality of second fans. With this configuration, the output of a second fan with low fan efficiency can be reduced preferentially.

The air supply system according to the eighth aspect is the system according to the sixth aspect, in which the first controller determines the output of the first fan to maintain a constant processing static pressure in the second fan with the lowest fan efficiency from among the plurality of second fans or to minimize the rotation speed of the second fan with the lowest fan efficiency from among the plurality of second fans.

In the air supply system according to the eighth aspect, the first controller determines the output of the first fan to maintain a constant processing static pressure in the second fan with the lowest fan efficiency from among the plurality of second fans or to minimize the rotation speed of the second fan with the lowest fan efficiency from among the plurality of second fans. With this configuration, the output of a fan with high fan efficiency can be increased preferentially.

The air supply system according to the ninth aspect is the system according to the seventh or eighth aspect, including a plurality of differential pressure sensors that detect the processing static pressure in the plurality of second fans, and the controller determines the output of the first fan on a basis of detected values from the plurality of differential pressure sensors.

The air supply system according to tenth aspect is the system according to the seventh or eighth aspect, in which in a case where the air flow volume of the second fan with a maximum fan efficiency among the plurality of second fans does not reach the target air flow volume, the first controller increases the output of the first fan.

In the air supply system according to the tenth aspect, the first controller can increase the output of the first fan to cause the air flow volume of the fan with the maximum fan efficiency among the plurality of second fans to reach the target air flow volume.

The air supply system according to the eleventh aspect is the system according to any of the sixth to tenth aspect, and further includes a fourth detector that detects an air flow volume of the first air sent by the first fan. The first controller uses at least one of the plurality of second detectors or the fourth detector to compare the fan efficiencies of the first fan and the plurality of second fans.

DESCRIPTION OF EMBODIMENTS (1) Overall Configuration

Figure 1:
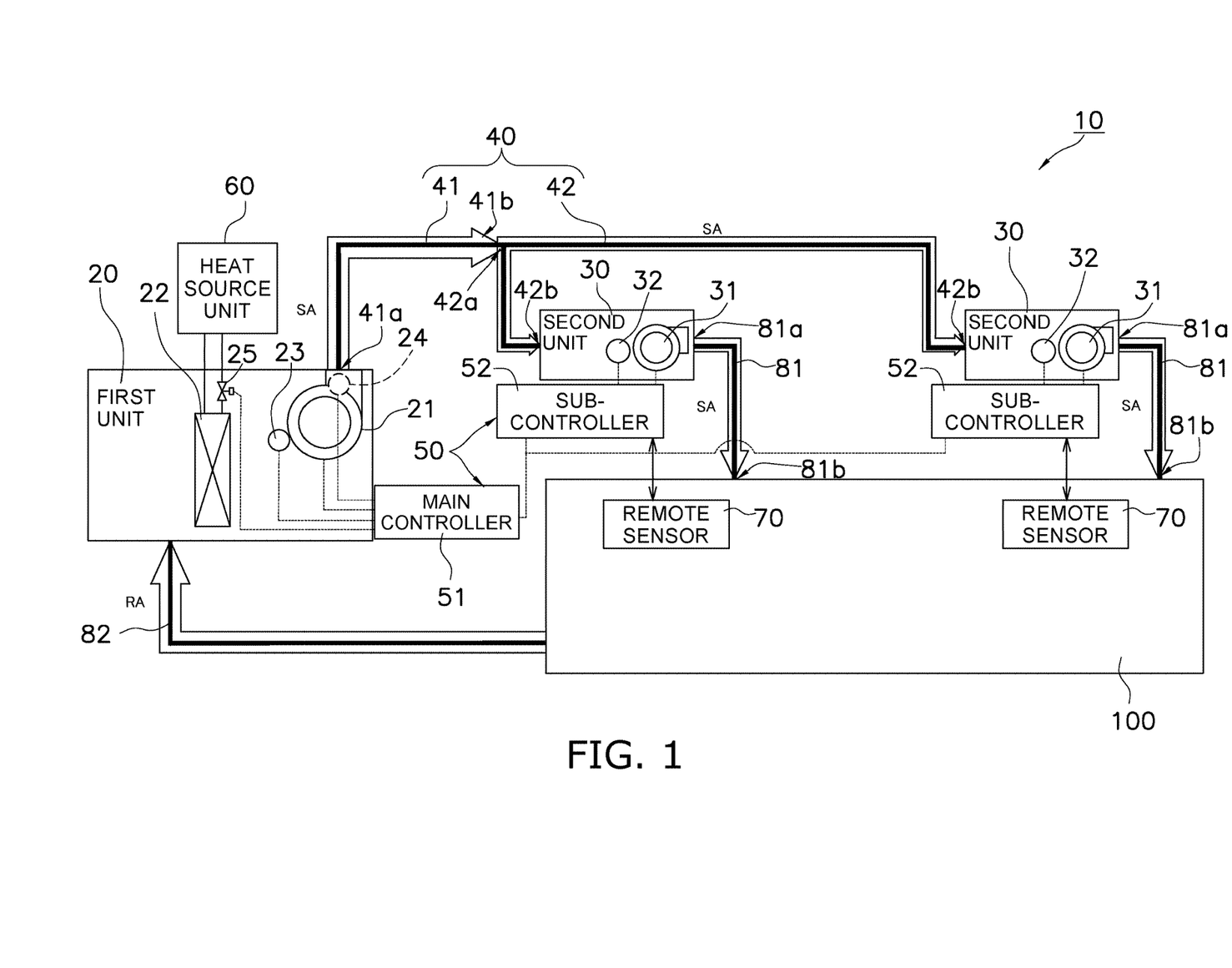
FIG. 1 is a conceptual diagram illustrating the configuration of an air supply system according to an embodiment.

An air supply system 10 illustrated in FIG. 1 is provided with a first unit 20, second units 30, a duct 40, and a controller 50. The first unit 20 includes a first fan 21. Each of the plurality of second units 30 includes a second fan 31. Each second fan 31 supplies air from the second unit 30 to a target space 100. The target space 100 is a room inside a building, for example. The room is a space where the movement of air is restricted by a floor, a ceiling, and walls, for example. The plurality of second units 30 are installed with respect to one or a plurality of target spaces 100. In FIG. 1, as a representative example of the air supply system 10 provided with a plurality of second units 30, an example is illustrated in which the air supply system 10 provided with two second units 30 is installed with respect to a single target space 100. The number of second units 30 may also be three or more, and is set appropriately. As described above, two or more target spaces 100 in which the second units 30 are installed may also exist.

The duct 40 distributes first air SA delivered from the first unit 20 by the first fan 21 to the plurality of second units 30. The duct 40 includes a main pipe 41 and a branch pipe 42 branching from the main pipe 41. In FIG. 1, a case where the main pipe 41 is disposed outside the first unit 20 is illustrated, but the main pipe 41 may also be disposed inside the first unit 20, and may also be disposed to extend from the inside of the first unit 20 to the outside of the first unit 20. The case where the main pipe 41 is disposed inside the first unit 20 also includes the case where a portion of a casing of the first unit 20 functions as the main pipe 41. In FIG. 1, an example is illustrated, in which an entrance 41a of the main pipe 41 is connected to the first unit 20. The first fan 21 is disposed inside the first unit 20. Here, all of the air blown out from the first fan 21 is configured to flow into the duct 40.

An exit 41b of the main pipe 41 of the duct 40 is connected to an entrance 42a of the branch pipe 42. A plurality of exits 42b of the branch pipe 42 are connected to the plurality of second units 30.

Each second unit 30 and the target space 100 are joined by a ventilation passage 81. An entrance 81a of the ventilation passage 81 is connected to the second units 30. Each second fan 31 produces air flow inside each second unit 30, the air flow proceeding from the exits 42b of the duct 40 to the entrance 81a of the ventilation passage 81. From a different perspective, each second fan 31 is suctioning the first air SA from the exits 42b of the branch pipe 42. Each second fan 31 can change the static pressure inside each second unit 30 (in front of the entrance 81a of the ventilation passage 81) by changing the rotation speed of each second fan 31 itself. Assuming that the static pressure in the duct 40 is constant, each second fan 31 can increase the rotation speed to thereby raise the static pressure inside each second unit 30 (in front of the entrance 81a of the ventilation passage 81). If the static pressure inside each second unit 30 rises, the air quantity of the first air SA flowing through the ventilation passage 81 increases. By changing the air quantity in this way, the supplied air flow volume that is blown out from an exit 81b of each ventilation passage 81 into the target space 100 changes.

The controller 50 includes a main controller 51 and a plurality of sub-controllers 52. The main controller 51 and the plurality of sub-controllers 52 are interconnected to form the controller 50. The main controller 51 controls the rotation speed of the first fan 21. In other words, the main controller 51 controls the output of the first fan 21. If the output of the first fan 21 increases, the state of the first fan 21 changes in the direction of increasing air flow volume sent from the first fan 21.

One sub-controller 52 is provided with respect to each second unit 30. Each sub-controller 52 outputs an instruction related to changing the air flow volume to the corresponding second fan 31. Each sub-controller 52 stores a target air flow volume. If the supplied air flow volume is insufficient with respect to the target air flow volume, each sub-controller 52 outputs an instruction (an instruction related to changing the air flow volume) for increasing the rotation speed of the second fan 31. Conversely, if the supplied air flow volume is excessive with respect to the target air flow volume, each sub-controller 52 outputs an instruction (an instruction related to changing the air flow volume) for decreasing the rotation speed of the second fan 31.

The controller 50 obtains information about the air quantity of the air supplied to the target space 100 by the plurality of second fans 31. The information about the air quantity indicates the quantity of air to be supplied to the target space 100 per second, for example, and the quantity of air to be supplied may also be referred to as the necessary supplied air flow volume. The controller 50 determines the demand output from the first fan 21 on the basis of the obtained information about the air quantity. The controller 50 controls the output of the first fan 21 to meet the determined demand output. Specifically, each sub-controller 52 obtains information about the air quantity of each corresponding second unit 30 from the second unit 30. Each sub-controller 52 outputs the information about the air quantity to the main controller 51.

(2) Detailed Configuration
(2-1) First Unit 20

Besides the first fan 21 already described, the first unit 20 includes a heat exchanger 22, a fourth detector 23, a temperature sensor 24, and a water quantity adjustment valve 25. The heat exchanger 22 is supplied with cold water or hot water for example as a heat medium from the heat source unit 60. The heat medium supplied to the heat exchanger 22 may also be a liquid other than cold water or hot water, such as brine, for example. For the fourth detector 23, an air flow sensor, a wind speed sensor, or a differential pressure sensor may be used, for example.

The fourth detector 23 detects the air flow volume sent by the first fan 21. The fourth detector 23 is connected to the main controller 51. The fourth detector 23 transmits the value of the air flow volume detected by the fourth detector 23 to the main controller 51. The air flow volume detected by the fourth detector 23 is the volume of air flowing through the main pipe 41 of the duct 40. In other words, the air flow volume detected by the fourth detector 23 is the total volume of supplied air flow supplied to the target space 100 from the plurality of second units 30.

The temperature sensor 24 detects the temperature of the first air SA sent from the first fan 21 to the duct 40. The temperature sensor 24 is connected to the main controller 51. The temperature sensor 24 transmits the value of the temperature detected by the temperature sensor 24 to the main controller 51.

The first unit 20 is joined to the target space 100 through a ventilation passage 82. Second air RA passing through the ventilation passage 82 and returning from the target space 100 is sent through the heat exchanger 22 to the duct 40 by the first fan 21. The second air RA returning from the target space 100 is air that existed inside the target space 100. When passing through the heat exchanger 22, the returning second air RA exchanges heat with the cold water or hot water flowing through the heat exchanger 22 to become conditioned air. The water quantity adjustment valve 25 adjusts the amount of heat imparted to the first air SA that exchanges heat in the heat exchanger 22 and is sent to the duct 40. The opening degree of the water quantity adjustment valve 25 is controlled by the main controller 51. If the opening degree of the water quantity adjustment valve 25 is increased, the amount of water flowing through the heat exchanger 22 increases, and more heat is exchanged per unit time between the heat exchanger 22 and the first air SA. Conversely, if the opening degree of the water quantity adjustment valve 25 is decreased, the amount of water flowing through the heat exchanger 22 decreases, and less heat is exchanged per unit time between the heat exchanger 22 and the first air SA.

(2-2) Second Unit 30

Besides the second fan 31 already described, each second unit 30 includes a second detector 32. The second detector 32 detects the air flow volume sent by the second fan 31. Each second detector 32 is connected to a corresponding sub-controller 52. The value of the air flow volume detected by the second detector 32 is transmitted to the sub-controller 52. The air flow volume detected by the second detector 32 is the volume of air flowing through the ventilation passage 81. In other words, the air flow volume detected by each second detector 32 is the supplied air flow volume supplied to the target space 100 from each second unit 30. For the second detector 32, an air flow sensor, a wind speed sensor, or a differential pressure sensor may be used, for example.

(2-3) Remote Sensor 70

A plurality of remote sensors 70 function as temperature sensors. Each remote sensor 70 is configured to transmit data indicating the temperature of the second air RA in the target space 100 to a corresponding sub-controller 52.

(3) Operation of Air Supply System 10

Each of the plurality of sub-controllers 52 receives a detected value of the temperature of the target space from the connected remote sensor 70 respectively. Each sub-controller 52 stores data indicating a set temperature. For example, the data indicating the set temperature is transmitted to each sub-controller 52 in advance from a remote controller (not illustrated) or the like. Each sub-controller 52 stores the data indicating the set temperature received from the remote controller or the like in a storage device 52*b* (see FIG. 3) such as built-in memory. Each sub-controller 52 transmits the value of the set temperature to the main controller 51. On the basis of the set temperature, the main controller 51 determines a target air flow volume for each second unit 30 according to the temperature of the second air RA detected by the corresponding remote sensor 70. The main controller 51 transmits the value of the target air flow volume to each sub-controller 52.

The main controller 51 determines the output of the first fan 21 according to the total combined target air flow volume to be supplied to the target space 100.

For example, if the case where the static pressure at the exit 41*b* of the main pipe 41 (entrance 42*a* of the branch pipe 42) takes an intermediate value between the static pressure at the entrance 41*a* of the main pipe 41 and the static pressure at the exits 42*b* of the branch pipe 42 is compared to the case of taking a larger value than the intermediate value, the ratio of the output of the first fan 21 is larger than the ratio of the output of the plurality of second fans 31 in the case of taking a larger value than the intermediate value. Conversely, if the case where the static pressure at the exit 41*b* of the main pipe 41 (entrance 42*a* of the branch pipe 42) takes the intermediate value is compared to the case of taking a value smaller than the intermediate value, the ratio of the output of the first fan 21 is smaller than the ratio of the output of the plurality of second fans 31 in the case of taking a smaller value. An efficient range exists for the ratio of the output of the first fan 21 and the output of the plurality of second fans 31. Accordingly, the main controller 51 determines the output of the first fan 21 such that an efficient ratio is achieved. In other words, the main controller 51 determines the outputs of the first fan 21 to be a predetermined suitable output with respect to the total combined target air flow volume.

For example, if a method of determining the output of the first fan 21 like the following is considered, a range of the output of the first fan 21 suitable for reducing the power consumption of the output of the first fan 21 is demonstrated to exist. If the output of the first fan 21 is raised such that the total power consumption by the first fan 21 and the plurality of second fans 31 rises, the output of the first fan 21 is gradually decreased, and if the output of the first fan 21 is determined before the total power consumption by the first fan 21 and the plurality of second fans 31 rebounds, the range of the determined output is a range in which the power consumption is smaller compared to other ranges. Conversely, if the output of the first fan 21 is decreased such that the total power consumption by the first fan 21 and the plurality of second fans 31 rises, the output of the first fan 21 is gradually raised, and if the output of the first fan 21 is determined before the total power consumption by the first fan 21 and the plurality of second fans 31 rebounds, the range of the determined output is a range in which the power consumption is smaller compared to other ranges. If the output of the first fan 21 is decreased such that the total power consumption by the first fan 21 and the plurality of second fans 31 rises, the output of the first fan 21 is gradually raised, and if the output of the first fan 21 is determined before the total power consumption by the first fan 21 and the plurality of second fans 31 rebounds, the range of the determined output is a range in which the power consumption is smaller compared to other ranges. Conversely, if the output of the first fan 21 is decreased such that the total power consumption by the first fan 21 and the plurality of second fans 31 decreases, the output of the first fan 21 is gradually decreased, and if the output of the first fan 21 is determined before the total power consumption by the first fan 21 and the plurality of second fans 31 rebounds, the range of the determined output is a range in which the power consumption is smaller compared to other ranges. However, the method of determining the appropriate output of the first fan 21 is not limited to such a method.

After the main controller 51 determines the target air flow volume and transmits the value of the target air flow volume to each of the sub-controllers 52, each sub-controller 52 adjusts the rotation speed of the second fan 31 in each corresponding second unit 30, except for the second unit 30 with the highest fan efficiency. The numbers of revolutions of the plurality of second fans 31 are adjusted independently from each other.

At this time, for the determined output of the first fan 21, the rotation speed of the second fan 31 in the second unit 30 with the highest fan efficiency is at a maximum. Here, in the case where the static pressure at the entrance 42*a* of the branch pipe 42 is the same and the supplied air flow volume to be supplied to the target space 100 is the same, the second unit 30 with the highest fan efficiency is the second unit 30 with the lowest energy consumption. Also, in the case where the static pressure at the entrance 42*a* of the branch pipe 42 is the same and the supplied air flow volume to be supplied to the target space 100 is the same, the second unit 30 with the lowest fan efficiency is the second unit 30 with the highest energy consumption.

Each sub-controller 52 controls the rotation speed of each second fan 31 such that the supplied air flow volume matches the target air flow volume. The plurality of sub-controllers 52 control the numbers of revolutions of the plurality of second fans 31 independently from each other. If the air flow volume detected by the second detector 32 is small compared to the target air flow volume, each sub-controller 52 increases the rotation speed of each second fan 31. If the air flow volume detected by the second detector 32 is large compared to the target air flow volume, each sub-controller 52 decreases the rotation speed of each second fan 31. If the rotation speed of the second unit 30 with the highest fan efficiency falls, the main controller 51 makes an adjustment by changing the output of the first fan 21 such that the rotation speed of the second unit 30 with the highest fan efficiency is maximized.

When changing the air flow volume, in the case of changing the operating state of at least one of the plurality of second fans 31 or changing the air flow volume of at least one of the plurality of second fans 31, the main controller 51 prioritizes increasing the output of a fan with high fan efficiency or decreasing the output of a fan with low fan efficiency from among the first fan 21 and the plurality of second fans 31. In other words, in the case of increasing the volume of air flow to be supplied to the target space 100, the main controller 51 determines the output of the first fan 21 and the target air flow volume of the plurality of second units 30 to increase the output of a fan with high fan efficiency from among the first fan 21 and the plurality of second fans 31. Conversely, in the case of decreasing the volume of air flow to be supplied to the target space 100, the main controller 51 determines the output of the first fan 21 and the target air flow volume of the plurality of second units 30 to decrease the output of a fan with high fan efficiency from among the first fan 21 and the plurality of second fans 31.

However, in the case where the air flow volume of the second unit 30 with the maximum fan efficiency among the plurality of second units 30 does not reach the target air flow volume, the main controller 51 increases the output of the first fan 21. At this time, the main controller 51 increases the output of the first fan 21 and also keeps the rotation speed of the second fan 31 in the second unit 30 with the maximum fan efficiency at maximum.

(4) Modifications (4-1) Modification 1A

The above embodiment describes a case where, when the main controller 51 determines the output of the first fan 21, the main controller 51 maximizes the rotation speed of the second fan 31 with the highest fan efficiency from among the plurality of second fans 31.

However, when the main controller 51 determines the output of the first fan 21, the main controller 51 may also be configured to determine the output of the first fan 21 to minimize the rotation speed of the second fan 31 with the lowest fan efficiency from among the plurality of second fans 31. In this case, the corresponding sub-controller 52 adjusts the rotation speed of the second fan 31 in each second unit 30 other than the second unit 30 with the lowest fan efficiency. The numbers of revolutions of the plurality of second fans 31 are adjusted independently from each other.

Figure 2:
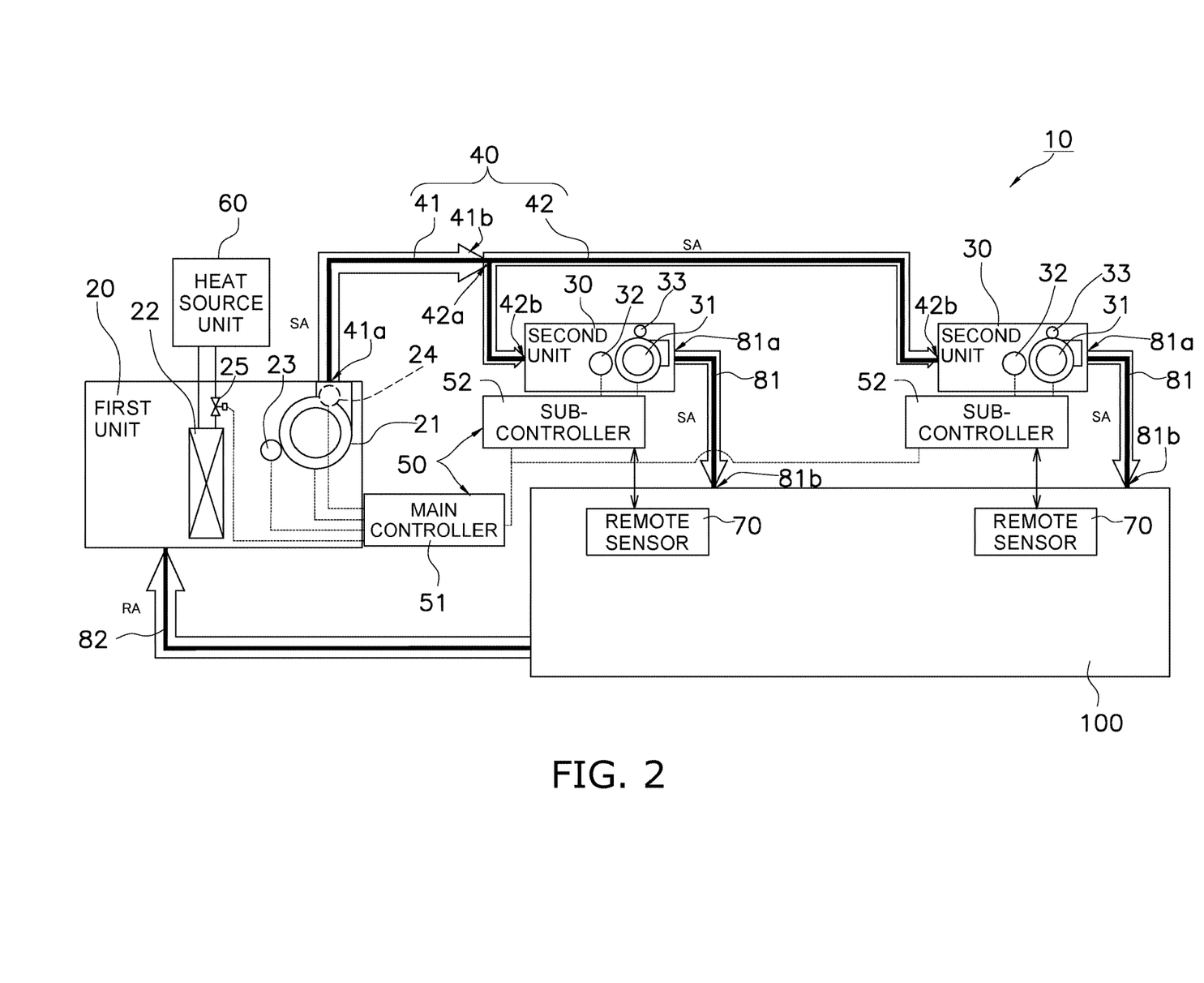
FIG. 2 is a conceptual diagram illustrating an example of the configuration of an air supply system according to a modification.

Also, in the case where the main controller 51 reduces the target air flow volume, the main controller 51 may also be configured to determine the output of the first fan 21 to maintain a constant processing static pressure in the second fan 31 with the highest fan efficiency from among the plurality of second fans 31. In the case of such a configuration, the second unit 30 with a constant processing static pressure among the second units 30 can keep the rotation speed of the highly efficient second fan 31 high compared to the others, and consequently keep the air supply system 10 as a whole at high efficiency. Thus, in the case of adopting a configuration that keeps the processing static pressure constant, each second unit 30 is provided with a differential pressure sensor 33 (see FIG. 2) for detecting the processing static pressure in each second fan 31, for example. Alternatively, the controller 50 may be configured to calculate the processing static pressure from the detection result of the second detector 32 and the rotation speed of the second fan 31. The controller 50 determines the output of the first fan 21 on the basis of the detected value from the differential pressure sensor 33 in the second unit 30 with the highest fan efficiency. In this case, the corresponding sub-controller 52 adjusts the rotation speed of the second fan 31 in each second unit 30 other than the second unit 30 maintained at a constant processing static pressure. The numbers of revolutions of the plurality of second fans 31 are adjusted independently from each other.

Also, in the case where the main controller 51 increases the target air flow volume, the main controller 51 may also be configured to determine the output of the first fan 21 to maintain a constant processing static pressure in the second fan 31 with the lowest fan efficiency from among the plurality of second fans 31. In the case of such a configuration, the second unit 30 with a constant processing static pressure among the second units 30 can keep the rotation speed of the low efficient second fan 31 low compared to the others, and consequently keep the air supply system 10 as a whole at high efficiency. Thus, in the case of adopting a configuration that keeps the processing static pressure constant, each second unit 30 is provided with a differential pressure sensor 33 (see FIG. 2) for detecting the processing static pressure in each second fan 31, for example. Alternatively, the controller 50 may be configured to calculate the processing static pressure from the detection result of the second detector 32 and the rotation speed of the second fan 31. The controller 50 determines the output of the first fan 21 on the basis of the detected value from the differential pressure sensor 33 in the second unit 30 with the lowest fan efficiency. In this case, the corresponding sub-controller 52 adjusts the rotation speed of the second fan 31 in each second unit 30 other than the second unit 30 maintained at a constant processing static pressure. The numbers of revolutions of the plurality of second fans 31 are adjusted independently from each other.

The foregoing embodiment describes a case where the remote sensor 70 includes a temperature sensor, but the remote sensor 70 may also include at least one function from among a temperature sensor, a $CO_2$ concentration sensor, and a humidity sensor, for example. In the case of such a configuration, each of the plurality of sub-controllers 52 receives a detected value of at least one of the temperature, the $CO_2$ concentration, and the humidity of the target space 100 from the connected remote sensor 70. Each sub-controller 52 stores data regarding a setting value of the detection target of the remote sensor 70. Each sub-controller 52 transmits at least one setting value from among the temperature, the $CO_2$ concentration, and the humidity to the main controller 51. On the basis of the setting values, the main controller 51 determines the target air flow volume of each second unit 30 according to the detected value from the corresponding remote sensor 70. The main controller 51 transmits the value of the target air flow volume to each sub-controller 52.

(4-3) Modification 1C

The foregoing embodiment describes a case where the first unit 20 includes the heat exchanger 22. However, the first unit 20 may also take a configuration that does not include the heat exchanger 22. For example, the air supply system 10 may be configured as a system that ventilates the target space 100 when the $CO_2$ concentration of the target space 100 is high.

(4-4) Modification 1D

Figure 3:
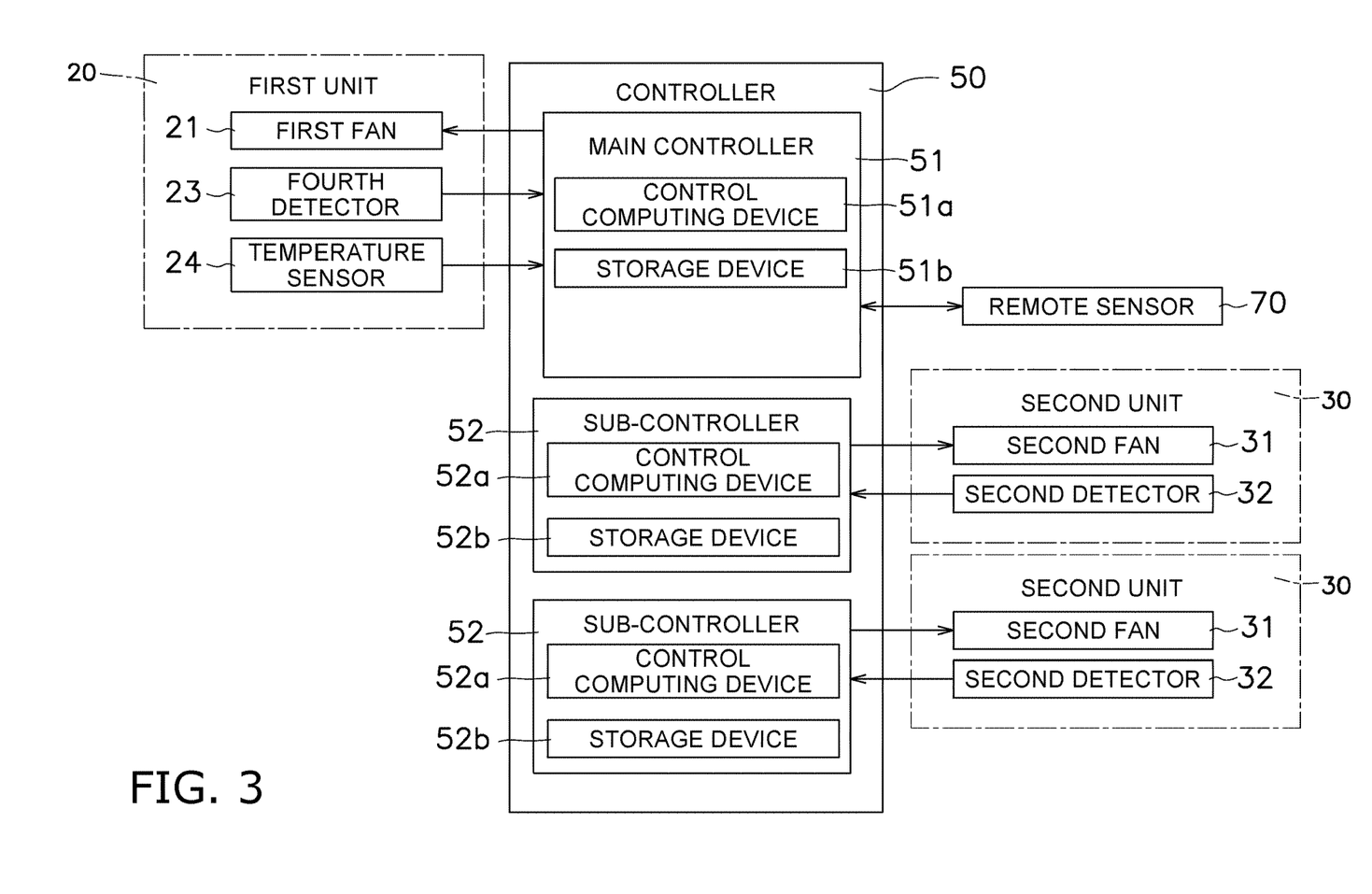
FIG. 3 is a block diagram for explaining the configuration of a controller.

The controller 50 is achieved by a computer. The controller 50 is provided with control computing devices 51a and 52a, and storage devices 51b and 52b. For the control computing devices 51a and 52a, a processor such as a CPU or GPU may be used. The control computing devices 51a and 52a read out programs stored in the storage devices 51b and 52b, and perform predetermined image processing and arithmetic processing according to the programs. Furthermore, the control computing devices 51a and 52a may follow the programs to write arithmetic results to the storage devices 51b and 52b or read out information stored in the storage devices 51b and 52b. In FIG. 3, various function blocks achieved by the control computing devices 51a and 52a are illustrated. The storage devices 51b and 52b may be used as databases.

(4-5) Modification 1E

Figure 4:
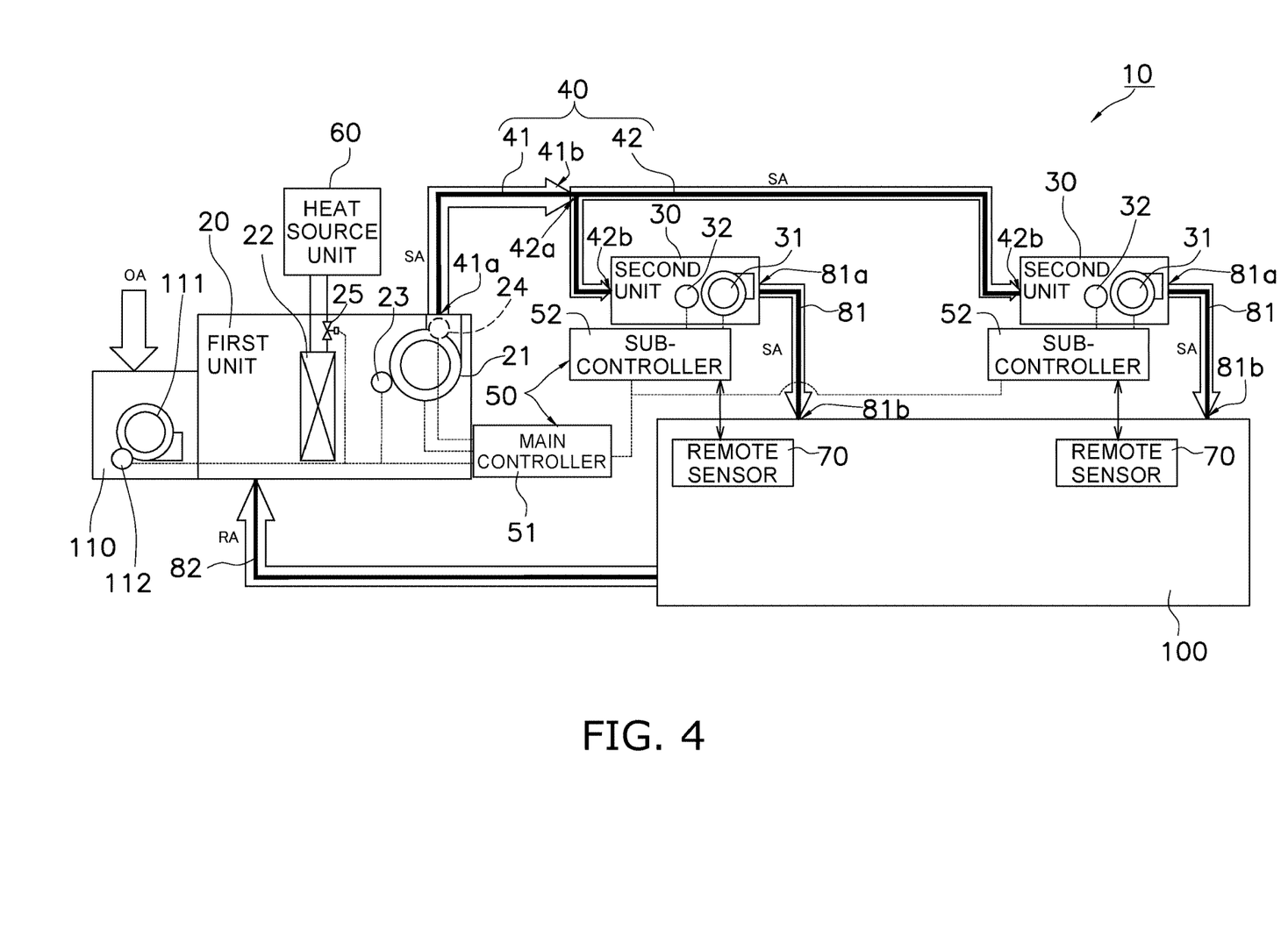
FIG. 4 is a conceptual diagram illustrating another example of the configuration of an air supply system according to a modification.

As illustrated in FIG. 4, an outdoor air introduction unit 110 may also be attached to the first unit 20. The outdoor air introduction unit 110 includes a third fan 111 and a fifth detector 112. The outdoor air introduction unit 110 uses the third fan 111 to take in and send outdoor air OA from outside the target space 100 to the first unit 20. The fifth detector 112 detects the air flow volume of the outdoor air OA sent to the first unit 20. The fifth detector 112 transmits the detected value of the sent air flow volume of the outdoor air OA to the main controller 51. In the case where the outdoor air OA is sent from the outdoor air introduction unit 110 to the first unit 20, the main controller 51 may be configured to correct the control of the output of the first fan 21 according to the sent air flow volume of the outdoor air OA. For the fifth detector 112, an air flow sensor, a wind speed sensor, or a differential pressure sensor may be used, for example.

(4-6) Modification 1F

Figure 5:
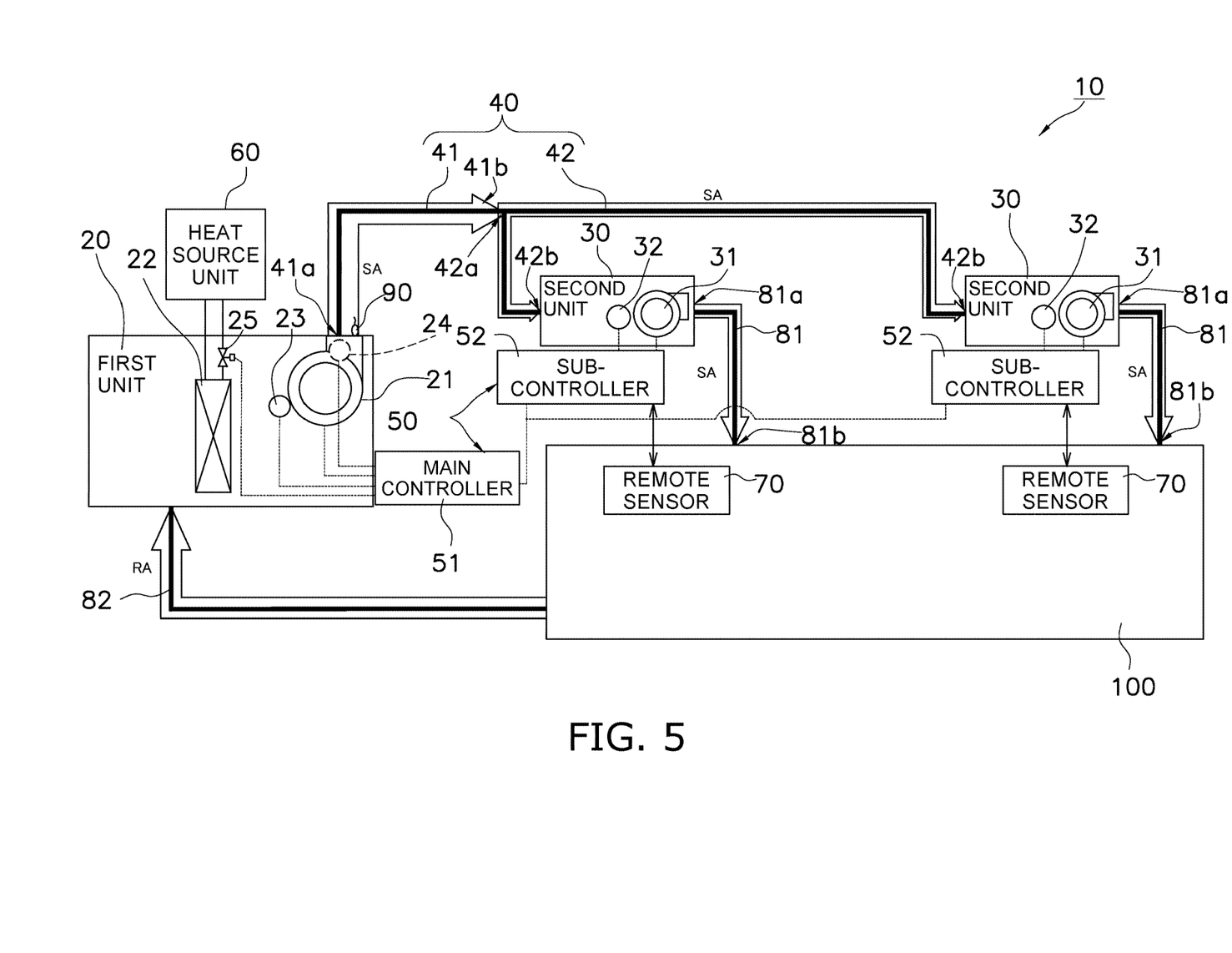
FIG. 5 is a conceptual diagram illustrating another example of the configuration of an air supply system according to a modification.

As illustrated in FIG. 5, in the air supply system 10 according to Modification 1F, a pressure sensor 90 acting as a third detector is disposed on the downstream side of the first unit 20 of the air supply system 10 according to the embodiment illustrated in FIG. 1. The pressure sensor 90 detects the pressure of the first air SA sent by the first fan 21. For example, the pressure sensor 90 is disposed near the first unit 20 in the duct 40, or in other words, near the entrance 41a of the duct 40. The configuration other than the pressure sensor 90 is similar to the air supply system 10 according to the foregoing embodiment, and therefore a description is omitted. The main controller 51 acquires the value of the pressure of the first air SA detected by the pressure sensor 90. The main controller 51 controls the rotation speed of the first fan 21 to keep the value of the pressure of the first air SA in a predetermined range. If the value of the pressure of the first air SA is below a lower limit of the predetermined range, the main controller 51 increases the rotation speed of the first fan 21. If the value of the pressure of the first air SA is above an upper limit of the predetermined range, the main controller 51 decreases the rotation speed of the first fan 21.

Figure 6:
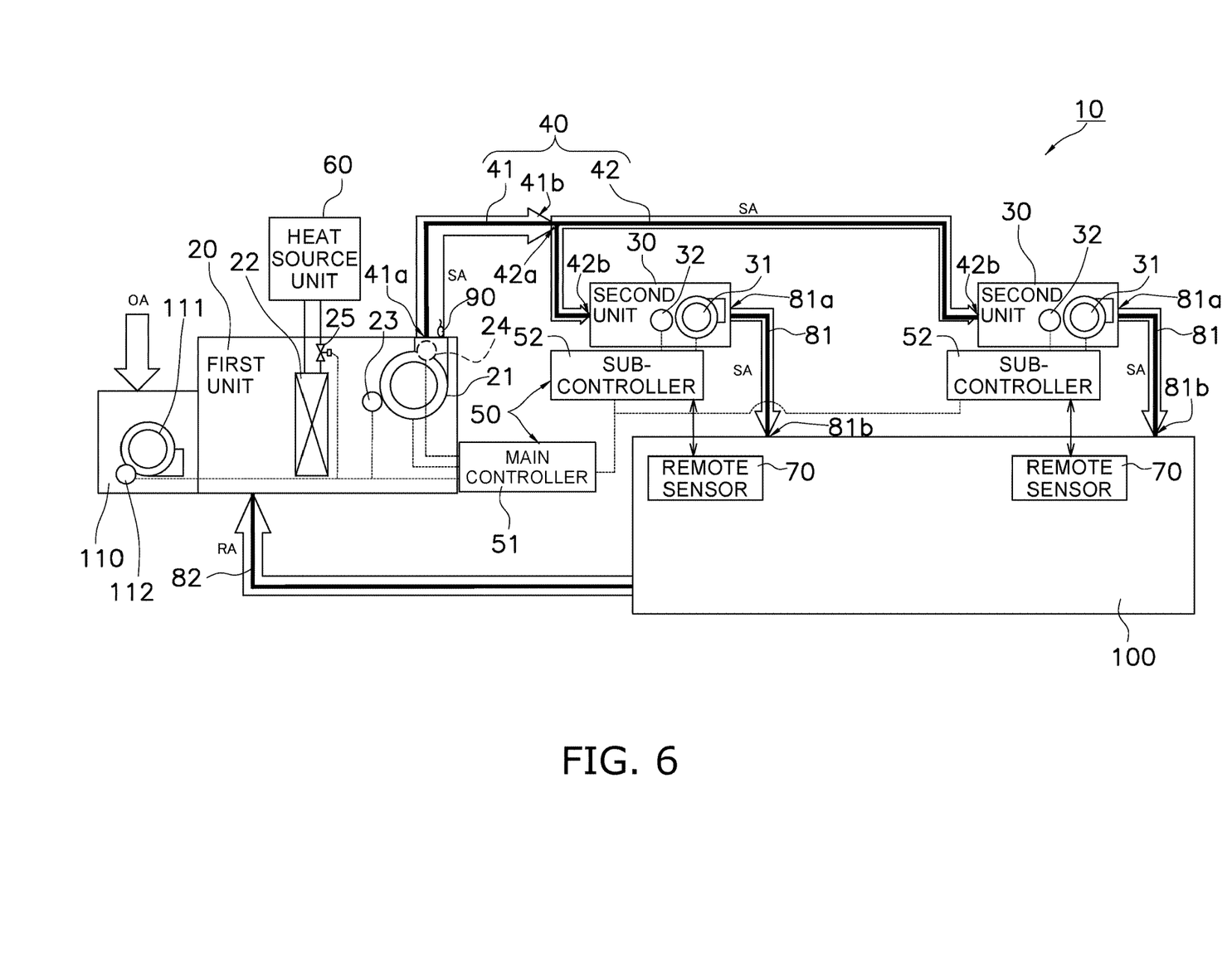
FIG. 6 is a conceptual diagram illustrating another example of the configuration of an air supply system according to a modification.
Figure 7:
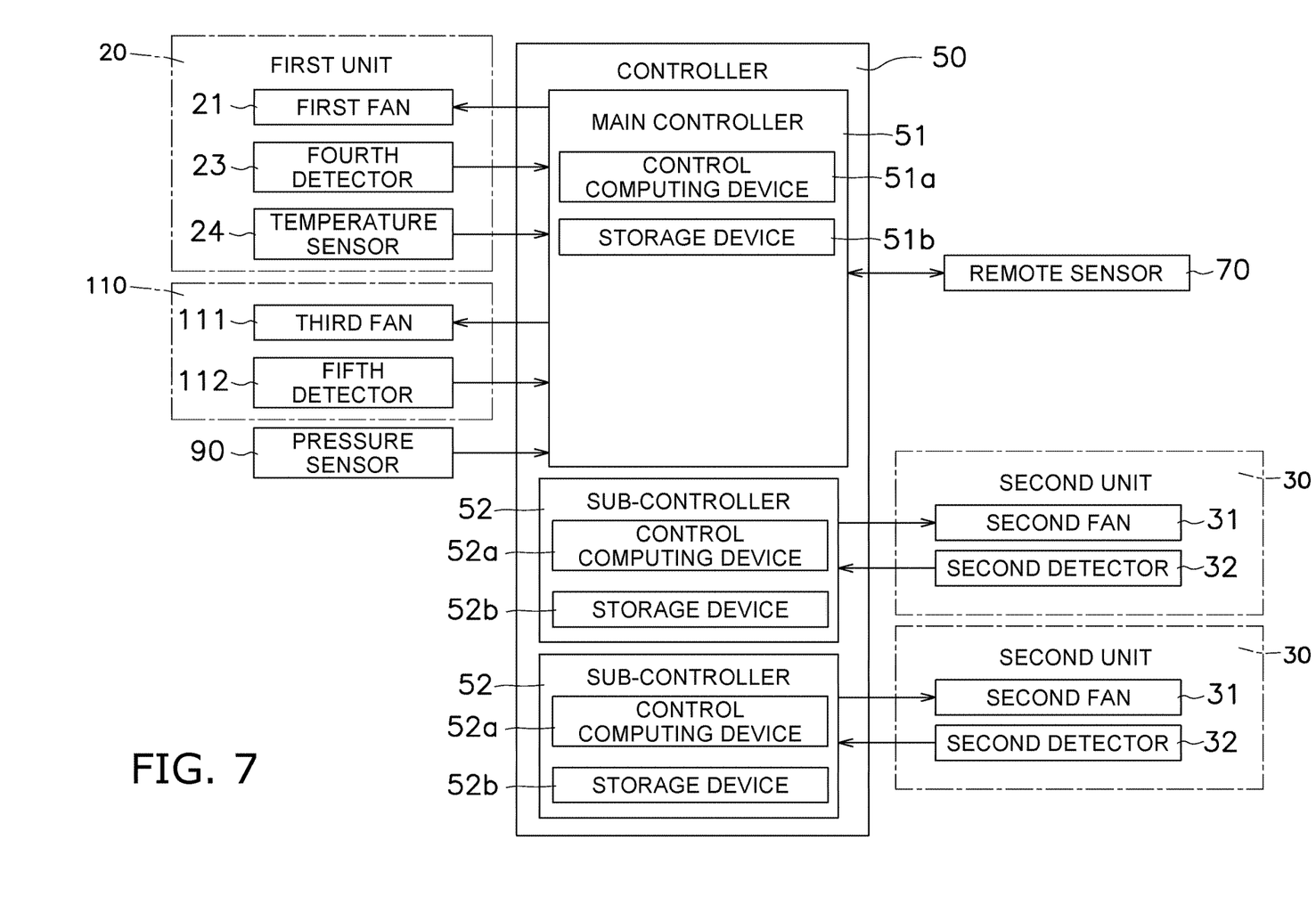
FIG. 7 is a block diagram for explaining the configuration of the controller illustrated in FIG. 6.

Moreover, as illustrated in FIG. 6, the pressure sensor 90 acting as the third detector may also be disposed on the downstream side of the first unit 20 of the air supply system 10 according to Modification 1E illustrated in FIG. 4. In FIG. 7, the configuration of the controller 50 in FIG. 6 is illustrated.

(5) Characteristics (5-1)

The air supply system 10 described above is provided with the first unit 20, the second units 30, the duct 40, the remote sensors 70 acting as the first detector, and the main controller 51 acting as the first controller. Each second unit 30 includes the second fan 31 that supplies the first air SA to the target space 100. The duct 40 sends the first air SA sent from the first unit 20 by the first fan 21 to the second units 30. The remote sensors 70 detect information about the second air RA in the target space 100. The information about the second air RA is the temperature of the second air RA, the $CO_2$ concentration of the second air RA, or the humidity of the second air RA, for example. The main controller 51 communicates with the second units 30 and the remote sensors 70. Each second unit 30 includes the second detector 32 acting as a second detector that detects the air flow volume sent by the second fan 31, and the sub-controller 52 acting as a second controller that controls the rotation speed of the second fan. the main controller 51 determines the target air flow volume of each second unit 30 on the basis of the information about the second air RA acquired from the remote sensors 70, namely the detected value of the temperature, the detected value of the $CO_2$ concentration, or the detected value of the humidity. The main controller 51 transmits an instruction indicating the determined target air flow volume to the sub-controllers 52. Each sub-controller 52 controls the rotation speed of the second fan 31 such that the air flow volume detected by the second detector 32 approaches the target air flow volume.

In the air supply system 10 thus configured, the second unit 30 receives the indicated value of the air flow volume from the main controller 51, and the sub-controller 52 can automatically control the air flow volume in the second unit 30 itself without depending on the main controller 51. Thus, it is sufficient to supply the indicated value of an appropriate air flow volume from the main controller 51 to the second unit 30, and the control load on the main controller 51 can be reduced.

(5-2)

In the air supply system 10 according to the embodiment described above, the first unit 20 can exchange heat with the heat medium in the heat exchanger 22 and send the air-conditioned air to a plurality of second units 30. The plurality of second units 30 can use the air-conditioned air to air-condition the target space 100.

(5-3)

The controller 50 of the air supply system 10 described above determines the air flow volume of the air supplied by the plurality of second units 30 according to at least one of the temperature, the humidity, and the $CO_2$ concentration of the target space 100, and controls the air flow volume of each of the plurality of second units 30. In such an air supply system 10, the controller 50 can control the air flow volume of each of the plurality of second units 30 to keep at least one of the temperature, the humidity, and the $CO_2$ concentration of the target space 100 in an suitable range.

(5-4)

The air supply system 10 according to Modification 1F is provided with the pressure sensor 90, which is disposed on the downstream side of the first unit 20 and acts as a third detector that detects the pressure of the first air SA sent by the first fan 21. The main controller 51 controls the rotation speed of the first fan 21 to keep the value of the pressure acquired from the pressure sensor 90 in a predetermined range. As the result, by keeping the value of the pressure on the downstream side of the first unit 20 in a predetermined range, the air supply system can eliminate excess power consumption occurring in the first fan 21 and the second fan 31 compared to the case where the value of the pressure on the downstream side of the first unit 20 is outside the predetermined range.

(5-5)

In the air supply system 10 described above, the main controller 51 can control the output of the first fan 21 to a suitable value to match the total combined air flow volume supplied to the target space 100. The total supplied air flow volume is an example of the air quantity of the first air SA in the plurality of second fans 31. Through such control by the main controller 51, the air supply system 10 is capable of moderating the energy consumption of the system as a whole.

(5-6)

The air supply system 10 described above can be configured such that in a case of changing an operating state of at least one of the plurality of second fans 31 or changing the air flow volume of at least one of the plurality of second fans 31, the main controller 51 prioritizes increasing an output of a fan with high fan efficiency or decreasing the output of a fan with low fan efficiency from among the first fan 21 and the plurality of second fans 31. In the air supply system 10 configured in this way, the main controller 51 prioritizes increasing the output of a fan with high fan efficiency or decreasing the output of a fan with low fan efficiency to moderate the energy consumption of the air supply system 10.

(5-7)

In the air supply system 10 described above, the main controller 51 is configured to determine the output of the first fan 21 to maintain a constant processing static pressure in the second fan 31 with the highest fan efficiency from among the plurality of second fans 31 or to maximize the rotation speed of the second fan 31 with the highest fan efficiency from among the plurality of second fans 31, and thereby prioritizes decreasing the output of a second fan 31 with a low fan efficiency. As a result of prioritizing decreasing the output of a second fan 31 with a low fan efficiency, such a configuration can reduce the energy consumption compared to the case of decreasing the output of a second fan 31 with a higher fan efficiency.

(5-8)

In the air supply system 10 described above, the main controller 51 is configured to determine the output of the first fan 21 to maintain a constant processing static pressure in the second fan 31 with the lowest fan efficiency from among the plurality of second fans 31 or to minimize the rotation speed of the second fan 31 with the lowest fan efficiency from among the plurality of second fans 31, and thereby prioritizes increasing the output of a fan with a high fan efficiency. As a result of prioritizing increasing the output of a second fan 31 with a high fan efficiency, such a configuration can reduce the energy consumption compared to the case of increasing the output of a second fan 31 with a lower fan efficiency.

(5-9)

In the air supply system 10 described above, in the case where the air flow volume of the second fan 31 with the maximum fan efficiency among the plurality of second fans 31 does not reach the target air flow volume, the main controller 51 increases the output of the first fan 21. In the air supply system 10 configured in this way, the main controller 51 can increase the output of the first fan 21 to cause the air flow volume of the second fan 31 with the maximum fan efficiency among the plurality of second fans 31 to reach the target air flow volume.

The embodiments of the present disclosure have been described above, but it will be understood that various modifications can be made to the embodiments and details without departing from the object and the scope of the present disclosure recited in the claims.

REFERENCE SIGNS LIST

10: Air supply system
20: First unit
21: First fan
22: Heat exchanger
23: Fourth detector
30: Second unit
31: Second fan
32: Second detector
33: Differential pressure sensor
40: Duct
50: Controller
51: Main controller (example of first controller)
52: Sub-controller (example of second controller)
70: Remote sensor (example of first detector)
90: Pressure sensor (example of third detector)

CITATION LIST

Patent Literature

Patent Literature 1: JP 2001-304614 A

The invention claimed is:

1. An air supply system comprising:
a first unit including a first fan;
a second unit including a second fan that supplies first air to a target space;
a duct that sends the first air sent from the first unit by the first fan to the second unit;
a first detector that detects information about second air in the target space; and
a first controller that communicates with the first unit, the second unit, and the first detector, wherein
the second unit includes a second detector that detects an air flow volume sent by the second fan and a second controller that controls a rotation speed of the second fan,
the first controller determines a target air flow volume of the second unit on a basis of the information about the second air acquired from the first detector, and transmits an instruction including the target air flow volume to the second controller, and
the second controller controls the rotation speed of the second fan such that the air flow volume detected by the second detector approaches the target air flow volume.

2. The air supply system according to claim 1, wherein
the first unit includes a heat exchanger through which a heat medium flows, and
the heat exchanger causes heat to be exchanged between the first air sent by the first fan and the heat medium.

3. The air supply system according to claim 2, wherein
the first detector is a temperature sensor, a $CO_2$ concentration sensor, or a humidity sensor, and
the first controller determines the target air flow volume of the second unit on a basis of a set temperature, a set $CO_2$ concentration, or a set humidity of the target space set in advance and a value detected by the first detector.

4. The air supply system according to claim 1, further comprising
a third detector, disposed on a downstream side of the first unit, that detects a pressure of the first air sent by the first fan, wherein
the first controller controls a rotation speed of the first fan to keep a value of the pressure acquired from the third detector in a predetermined range.

5. The air supply system according to claim 1, wherein
the air supply system comprises a plurality of second units each having a second fan,
the duct sends the first air sent from the first unit by the first fan to the plurality of second units,
a plurality of first detectors are respectively provided in correspondence with the plurality of second units, and
the first controller determines the plurality of target air flow volumes of the plurality of second units on a basis of the information about the second air in the target space acquired from the plurality of first detectors, and transmits instructions indicating each target air flow volume to each second controller.

6. The air supply system according to claim 5, wherein
in a case of changing an operating state of at least one of the plurality of second fans or changing the air flow volume of at least one of the plurality of second fans, the first controller prioritizes increasing an output of a fan with high fan efficiency or decreasing the output of a fan with low fan efficiency from among the first fan and the plurality of second fans.

7. The air supply system according to claim 6, wherein
the first controller determines the output of the first fan to maintain a constant processing static pressure in the second fan with the highest fan efficiency from among the plurality of second fans or to maximize the rotation speed of the second fan with the highest fan efficiency from among the plurality of second fans.

8. The air supply system according to claim 6, wherein
the first controller determines the output of the first fan to maintain a constant processing static pressure in the second fan with the lowest fan efficiency from among the plurality of second fans or to minimize the rotation speed of the second fan with the lowest fan efficiency from among the plurality of second fans.

9. The air supply system according to claim 7, comprising:
a plurality of pressure sensors that detect the processing static pressure in the plurality of second fans, wherein
the first controller determines the output of the first fan on a basis of detected values from the plurality of differential pressure sensors.

10. The air supply system according to claim 7, wherein in a case where the air flow volume of the second fan with a maximum fan efficiency among the plurality of second fans does not reach the target air flow volume, the first controller increases the output of the first fan.

11. The air supply system according to claim 6, further comprising:
a fourth detector that detects an air flow volume of the first air sent by the first fan, wherein
the first controller uses at least one of the plurality of second detectors or the fourth detector to compare the fan efficiencies of the first fan and the plurality of second fans.

12. The air supply system according to claim 2, further comprising
a third detector, disposed on a downstream side of the first unit, that detects a pressure of the first air sent by the first fan, wherein
the first controller controls a rotation speed of the first fan to keep a value of the pressure acquired from the third detector in a predetermined range.

13. The air supply system according to claim 3, further comprising
a third detector, disposed on a downstream side of the first unit, that detects a pressure of the first air sent by the first fan, wherein
the first controller controls a rotation speed of the first fan to keep a value of the pressure acquired from the third detector in a predetermined range.

14. The air supply system according to claim 2, wherein
the air supply system comprises a plurality of second units each having a second fan,
the duct sends the first air sent from the first unit by the first fan to the plurality of second units,
a plurality of first detectors are respectively provided in correspondence with the plurality of second units, and
the first controller determines the plurality of target air flow volumes of the plurality of second units on a basis of the information about the second air in the target space acquired from the plurality of first detectors, and transmits instructions indicating each target air flow volume to each second controller.

15. The air supply system according to claim 3, wherein
the air supply system comprises a plurality of second units each having a second fan,
the duct sends the first air sent from the first unit by the first fan to the plurality of second units,
a plurality of first detectors are respectively provided in correspondence with the plurality of second units, and
the first controller determines the plurality of target air flow volumes of the plurality of second units on a basis of the information about the second air in the target space acquired from the plurality of first detectors, and transmits instructions indicating each target air flow volume to each second controller.

16. The air supply system according to claim 4, wherein
the air supply system comprises a plurality of second units each having a second fan,
the duct sends the first air sent from the first unit by the first fan to the plurality of second units,
a plurality of first detectors are respectively provided in correspondence with the plurality of second units, and
the first controller determines the plurality of target air flow volumes of the plurality of second units on a basis of the information about the second air in the target space acquired from the plurality of first detectors, and transmits instructions indicating each target air flow volume to each second controller.

17. The air supply system according to claim 8, comprising:
a plurality of pressure sensors that detect the processing static pressure in the plurality of second fans, wherein
the first controller determines the output of the first fan on a basis of detected values from the plurality of differential pressure sensors.

18. The air supply system according to claim 8, wherein in a case where the air flow volume of the second fan with a maximum fan efficiency among the plurality of second fans does not reach the target air flow volume, the first controller increases the output of the first fan.

19. The air supply system according to claim 7, further comprising:
a fourth detector that detects an air flow volume of the first air sent by the first fan, wherein
the first controller uses at least one of the plurality of second detectors or the fourth detector to compare the fan efficiencies of the first fan and the plurality of second fans.

20. The air supply system according to claim 8, further comprising:
a fourth detector that detects an air flow volume of the first air sent by the first fan, wherein
the first controller uses at least one of the plurality of second detectors or the fourth detector to compare the fan efficiencies of the first fan and the plurality of second fans.

21. The air supply system according to claim 1, wherein the second controller stores the target air flow volume.

* * * * *